United States Patent
Tang (10) Patent No.: US 8,285,006 B2
(45) Date of Patent: Oct. 9, 2012

(54) HUMAN FACE RECOGNITION AND USER INTERFACE SYSTEM FOR DIGITAL CAMERA AND VIDEO CAMERA

(75) Inventor: Chi Sun Jackson Tang, Taipei Hsien (TW)

(73) Assignee: Mira Electronics Co., Ltd., Taipei (TW)

( * ) Notice: Subject to any disclaimer, the term of this patent is extended or adjusted under 35 U.S.C. 154(b) by 1190 days.

(21) Appl. No.: 12/060,976

(22) Filed: Apr. 2, 2008

(65) Prior Publication Data

US 2008/0279425 A1    Nov. 13, 2008

Related U.S. Application Data

(60) Provisional application No. 60/911,559, filed on Apr. 13, 2007.

(51) Int. Cl.
*G06K 9/00*    (2006.01)

(52) U.S. Cl. ........ 382/118; 382/103; 382/115; 382/117; 382/209; 715/762

(58) Field of Classification Search .................. None
See application file for complete search history.

(56) References Cited

U.S. PATENT DOCUMENTS

| 7,558,408 B1 * | 7/2009 | Steinberg et al. | 382/118 |
| 2004/0120561 A1 * | 6/2004 | Goto | 382/128 |
| 2005/0207622 A1 * | 9/2005 | Haupt et al. | 382/118 |

* cited by examiner

*Primary Examiner* — Chan S Park
*Assistant Examiner* — Elisa Rice
(74) *Attorney, Agent, or Firm* — James W. Huffman (57) ABSTRACT

The present invention discloses a face recognition system which includes a face recognition method and associate apparatus. The disclosed method provides improved face matching accuracy by introduction of user intervention. When a target face to be recognized has been detected, a candidate list is generated and the user is allowed to actively select a matching candidate face out of the candidate list by entering a user input through a user interface provided by the disclosed apparatus. Data of the target face are then automatically registered to a database where the candidate face data are stored for updating the data of the matching candidate.

20 Claims, 12 Drawing Sheets

HUMAN FACE RECOGNITION AND USER INTERFACE SYSTEM FOR DIGITAL CAMERA AND VIDEO CAMERA

This application claims the benefit of U.S. Provisional Application No. 60/911,559 filed Apr. 13, 2007.

BACKGROUND OF THE INVENTION

1. Field of the Invention

The present invention generally relates to a face recognition method and apparatus, especially to a face recognition method allowing user intervention.

2. Description of the Prior Art

Face recognition is composed of two parts. The first part is face detection which is to detect the image containing one or more than one human face for a target face. The second part is to match the detected target face against other stored faces by comparing the similarities of the facial features. Face recognition within captured images is useful in many areas. For example, one can associate and organize all the images of the same identity captured at different times, places and by different devices.

However, most face recognition algorithms are error prone and the accuracy is often relatively low. Recognition accuracy is seriously affected by imaging conditions such as lighting condition, perspective and the imaging quality of the image capturing device. Moreover, human faces changes with time and factors such as hairstyle, makeup, skin color and so on can cause the recognition result less accurate. Also, very high computation is needed for face recognition algorithms and most embedded or mobile image capturing devices do not have enough computation power to perform sophisticated face recognition efficiently. Less sophisticated algorithms suitable for embedded or mobile image capturing devices are, however, much less accurate.

Therefore, a face recognition program which can run on embedded or mobile image capturing devices satisfyingly in terms of computation efficiency and recognition accuracy is greatly desired.

SUMMARY OF THE INVENTION

One feature of the present invention is to provide a face recognition method for application in embedded or mobile image and video capturing devices. The disclosed method can be embodied as an automatic face matching program which matches the current detected face against the stored face in database and as a result the user interface displays the matching results from highest confidence candidate to lower confidence candidates. If the highest confidence candidate matches the detected face, the newly detected face image is registered and associated with the identity of the matched faces in the database for future matching and retrieval.

Another feature of the present invention is to provide a method with increased accuracy of face recognition by introducing user intervention mechanism. In case of recognizing a wrong candidate for the detected face by the automatic face matching program, the user can verify and change the recognized candidates.

Further feature of the present invention is to provide an integrated user interface apparatus for the user intervention mechanism. The disclosed integrated user interface allows the user to recognize and switch among all the detected faces within the captured image, verify and change the recognized candidate faces.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

The present disclosure can be described by the embodiments given below. It is understood, however, that the embodiments below are not necessarily limitations to the present disclosure, but are used to a typical implementation of the invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary the intent is to cover all alternatives, modifications and equivalents included within the spirit and scope of the invention as defined by the appended claims.

It is noted that the drawings presents herein have been provided to illustrate certain features and aspects of embodiments of the invention. It will be appreciated from the description provided herein that a variety of alternative embodiments and implementations may be realized, consistent with the scope and spirit of the present invention.

It is also noted that the drawings presents herein are not consistent with the same scale. Some scales of some components are not proportional to the scales of other components in order to provide comprehensive descriptions and emphasizes to this present invention.

Figure 1A:
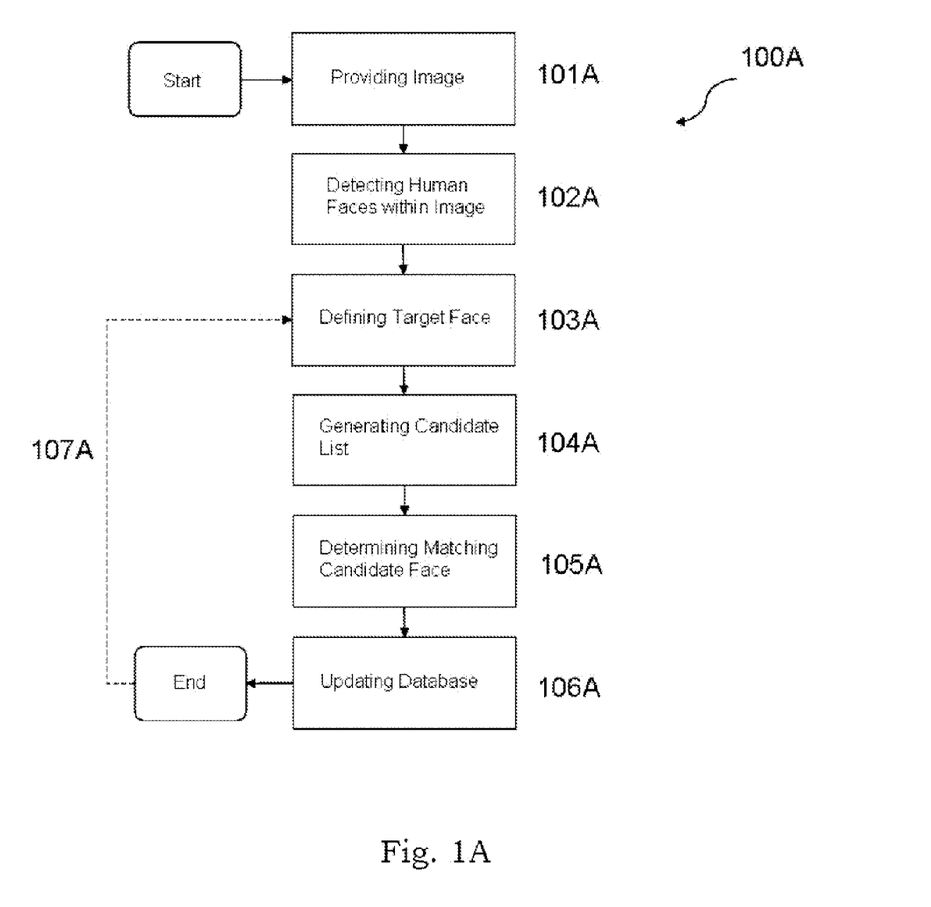
FIG. 1A is a flow diagram of a face recognition method in accordance with one embodiment of the present invention.

Referring to FIG. 1A, it is a flow diagram 100A of a face recognition method with an automatic database updating mechanism in accordance with one embodiment of the present invention. Firstly, an image is provided and detected for human faces that appear within the displayed image (101A, 102A). As multiple faces could be detected from the image, among the detected faces a target face will be defined (103A), for example, by the user. The detected target face has a set of extracted target facial features. Then, a candidate list which contains one or more candidate face is generated for the target face (104A). The candidate list is generated by searching the target facial features against the facial feature records pre-stored in a face database. Each candidate face on the candidate list has a set of candidate facial features of its own. Finally, the target facial features are compared with the above-mentioned candidate facial features, based on which a matching candidate face is determined out of the candidate list (105A). Generally, this matching candidate face is the highest confidence candidate face on the candidate list. The facial features of the matching candidate face stored in a face database are then updated with the target facial features (106A). It is noted that as mentioned earlier, multiple faces could be detected in single image, therefore in one preferred example the disclosed method further includes switching among the detected faces to assign the target face, after the recognition/database-updating actions as represented by the dotted line 107A in the figure. The whole process thus runs in cycles until all faces in the image have been analyzed. Alternatively, the user may select to terminate such cycle process with some detected faces unmatched.

Figure 1B:
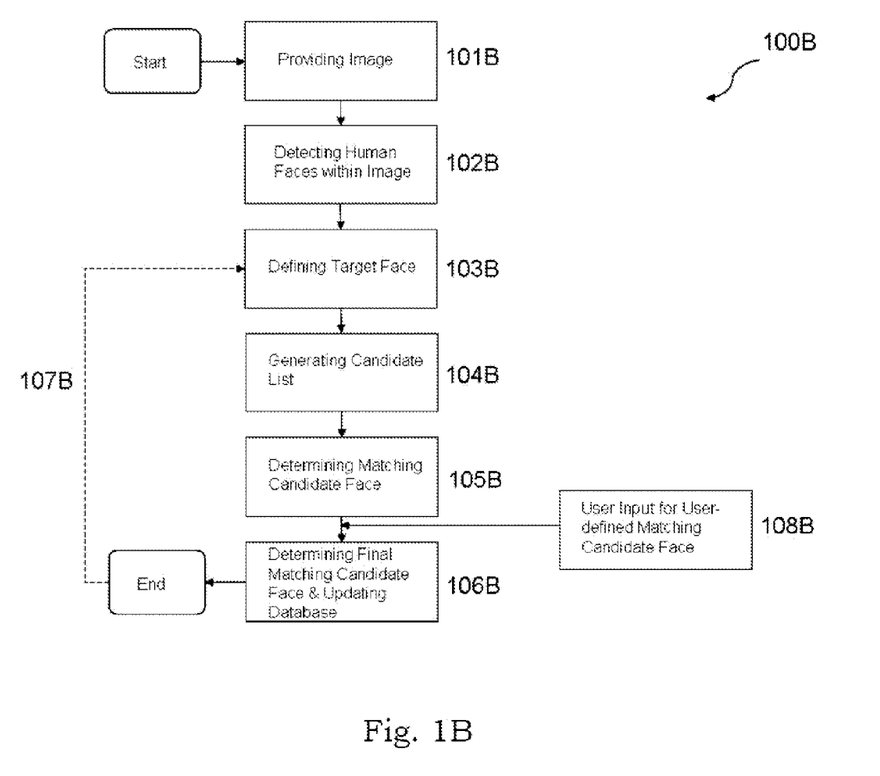
FIG. 1B is a flow diagram of a face recognition method in accordance with another embodiment of the present invention.

Referring to FIG. 1B, it is a flow diagram 100B of a face recognition method with an automatic database updating mechanism in accordance with another embodiment of the present invention. The method represented by the flow diagram 100B differs from that represented by the flow diagram 100A in that it further comprises receiving a user input which designates a user-selected matching candidate face out of the candidate list (108B). If the user-selected matching candidate face is identical with the above matching candidate face, i.e. the highest confidence candidate face, the facial features of the highest confidence candidate face are then updated with the target facial features (106B). However, if the user-selected matching candidate face is different from highest confidence candidate face, it is the facial features of the user-selected matching candidate face that are updated with the target facial features (106B).

In one example, the above user input is entered through a graphical user interface by modifying the appearance of at least one graphical feature representing the at least one program. In another example, the user-selection of matching candidate face mechanism is skippable on user's demand. The user can actively call off the mechanism through providing an input designating the same. In such case, the candidate facial features of the highest confidence candidate face stored in the database will be updated with the target facial features.

In a scenario that the target face is actually new to the database and there is no previous records to be compared with, the method may further includes allowing the user to, through providing a user input, designate that at least one of the candidates on the candidate list is to be added to the database. Then, in response the specific candidate faces and their candidate facial features will be added to the database where the candidate facial features data are stored.

Aside from a photo picture, the image displayed may be a frame extracted from a video, especially when the theme is to track a specific face in the video. In such cases, it is computational inefficient if each frame is analyzed in a one by one manner. To provide improved video face tracking, the disclosed method further comprises a frame re-estimation mechanism for identifying the "key frames", which is defined as frames having new or very different facial features from the tracked faces of the previous frames. The video is thus divided by several key frames of significant facial feature changes. As a result, only the key frames are reviewed during the face tracking process; frames with similar features are skipped, which greatly reduces the overall face recognition computation time. In one example of the present invention, the image is provided via the following process: (1) from a frame of the provided video at a certain frame position, say frame numbered n, detecting an arbitrary target face which has a set of arbitrary target facial features at frame numbered n; (2) from a subsequent frame of the provided video at frame numbered n+1, detecting the above arbitrary target face, this time it has a set of arbitrary target facial features at frame numbered n+1; (3) comparing the arbitrary target facial features at frame numbered n and frame numbered n+1, when the comparison result indicates that the arbitrary target facial features at frame numbered n+1 is new or different from that at frame numbered n, marking the frame at frame numbered n+1 as the image to be displayed, otherwise marking the frame at frame numbered n as the image to be displayed. It is noted that the arbitrary target face is not necessary to be the target face of interest as described in the previous sections.

Moreover, in video face tracking there are situations where the imaging condition is poor due to insufficient lighting, abrupt motion, shadowing, limited imaging angles . . . etc. leading to unclear or unidentifiable target facial features in certain frames within a video sequence. To overcome this, in one example of the present invention the disclosed method further includes a feature scoring mechanism for ensuring the quality of the facial features used for analysis. The mechanism first detects an arbitrary target face in a frame of the video at a certain frame position, say frame numbered n and extracts a set of arbitrary target facial features for this specific arbitrary target face at frame numbered n. Then, a score is estimated for the arbitrary target face at frame numbered n. Next, in a subsequent frame of the video at frame numbered n+1, the above arbitrary target face is again detected, and the set of arbitrary target facial features at frame numbered n+1 is extracted. Then, a score is again estimated for the extracted arbitrary target face at frame numbered n+1. Finally, the two estimated scores are compared, and when the comparison result indicates that the score of the arbitrary target face at frame numbered n+1 is higher than that at frame numbered n, the arbitrary target facial features at frame numbered n+1 will be marked as the arbitrary target facial features at frame numbered n and the target facial features for matching analysis, otherwise the arbitrary target facial features at frame numbered n will be marked as the arbitrary target facial features at frame numbered n and the target facial features for matching analysis. The score estimation is based on indices such as face orientation, clarity, shape, lighting condition, shadowing, and other measures. Therefore, high quality features are always chosen for analysis, which leads to improved matching accuracy. It should be noted that this mechanism can simultaneously monitor the target face and the background faces as well. Individual face may appear and disappear from image to image; the idea is to make sure whenever a face is analyzed, the facial features used for analysis are qualified.

Figure 2A:
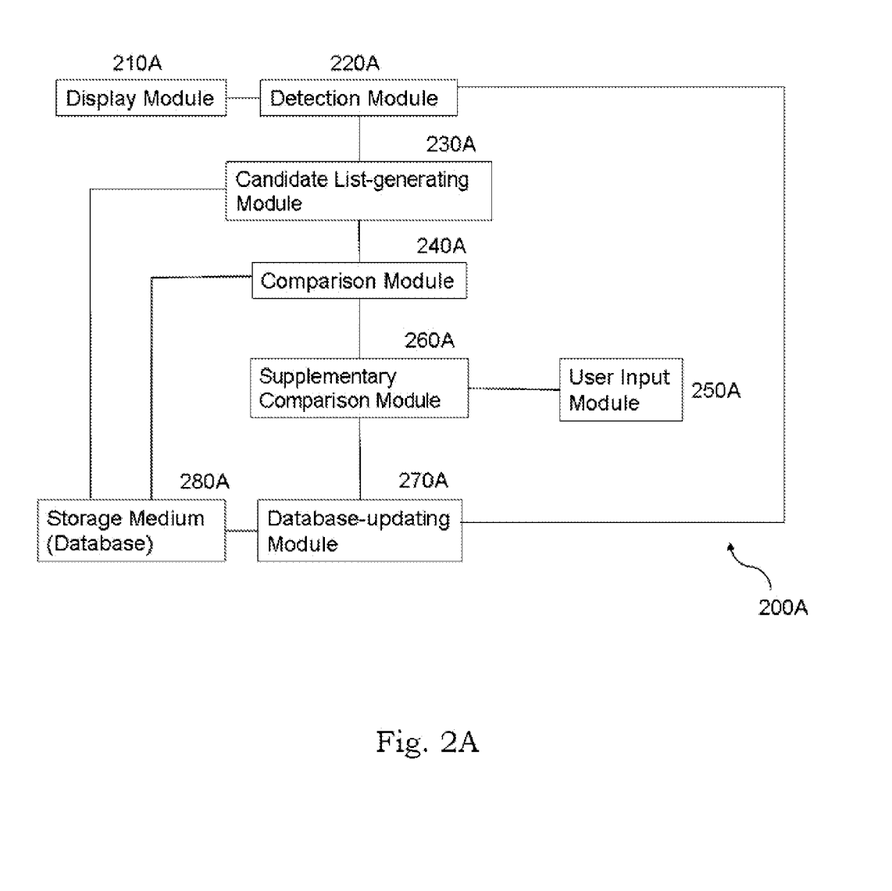
FIG. 2A is a block diagram of a face recognition apparatus in accordance with another embodiment of the present invention.

Referring to FIG. 2A, it is a block diagram of a face recognition apparatus 200A in accordance with another embodiment of the present invention. The disclosed face recognition apparatus comprises a display module 210A for displaying an image, a detection module 220A, a candidate list-generating module 230A, a comparison module 240A, a user input module 250A, a supplementary comparison module 260A, and a database-updating module 270A. The display module 210A can be an liquid crystal display (LCD), plasma display, light emitting diode (LED) display or any type of graphics displays. The detection module 220A is electrically coupled with the display module 210A for detecting a target face from the displayed image and whereupon to generate a detection result designating the detected target face, wherein the target face has a set of extracted target facial features. The candidate list-generating module 230A is electrically coupled with the detection module 220A, the comparison module 240A and a storage medium 280A. The candidate list-generating module 230A receives the detection result from the detection module 220A, generates a candidate list of one or more candidate faces in terms of matching the target face, wherein each candidate face has its own set of candidate facial features. The candidate facial features data are stored in a database stored in the storage medium 280A. The comparison module 240A is electrically coupled with the candidate list-generating module 230A, the supplementary comparison module 260A and the storage medium 280A. The comparison module 240A receives the candidate list from the candidate list-generating module 230A, compares the target face with each candidate face based on the target facial features and the candidate facial features of each candidate face, whereupon to generate a first comparison result indicating a first matching candidate face out of the candidate list. Normally, this first matching candidate face is the highest confidence candidate face. The user input module 250A is for receiving a user input which designates a second, user-defined matching candidate face out of the candidate list. The user input module 250A can be a press button, key pad, touch panel, voice control or any input means. The supplementary comparison module 260A is electrically coupled with the user input module 250A, the database-updating module 270A and the comparison module 240A for receiving the user input from the user input module 250A and the first comparison result from the comparison module 240A. In response, it compares the first and second matching candidate face based on the candidate facial features of the first and second matching candidate face, respectively, whereupon to generate a second comparison result. The database-updating module 270A is electrically coupled with the detection module 220A, the supplementary comparison module 260A and the storage medium 280A. The database-updating module 270A receives the target facial features data from the detection module 220A. In addition, it receives the second comparison result from the supplementary comparison module 260A and in response, when the second comparison result indicates that the first and second matching candidate faces are identical, updates the candidate facial features of the first matching candidate face stored in the database with the target facial features, otherwise it updates the candidate facial features of the second matching candidate face stored in the database with the target facial features.

Also referring to FIG. 2A, when the detection module 220A detects more than one target faces from the displayed image, the user input module 250A may receive an additional user input to designate the target face out of the detected faces. Then, in response, the detection module 220A generates the detection result accordingly i.e. indicating the target face as designated by the additional user input.

Figure 2B:
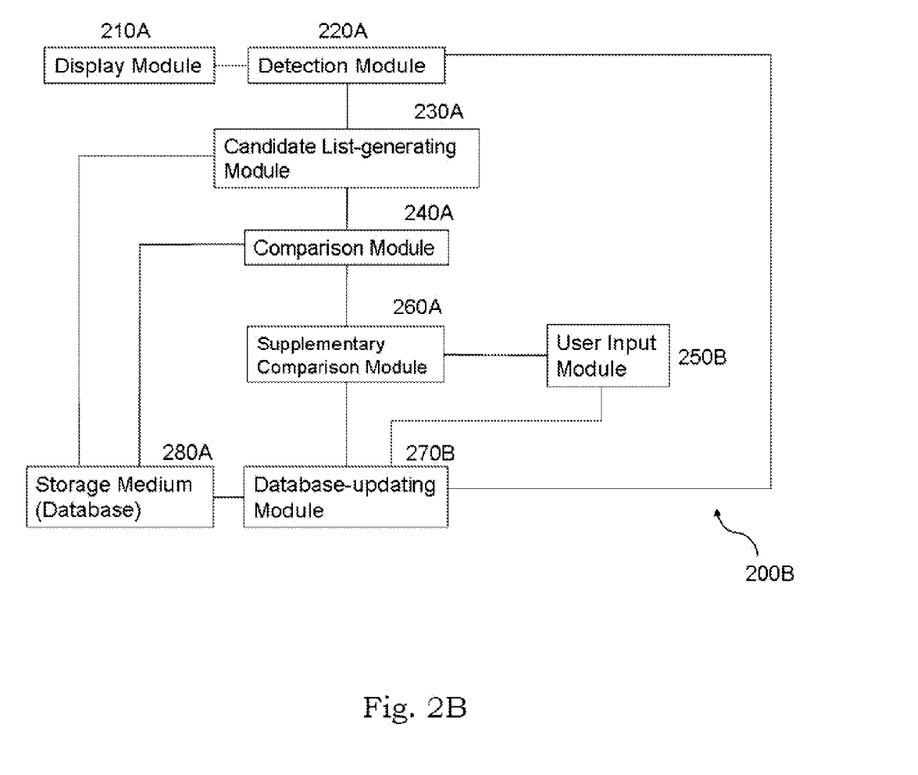
FIG. 2B is a block diagram of an face recognition apparatus in accordance with a preferred example of the present invention.

Referring to FIG. 2B, it is a block diagram of a face recognition apparatus 200B in accordance with a preferred example of the present invention. As shown, the user input module 250B is electrically coupled with the database-updating module 270B. In the scenario that the user decides that the target face is new to the database and should be added to the database for future matching, the user input module 250B receives yet additional user input which designates that at least one of the candidate faces on the candidate list is to be added to the database. In response, the database-updating module 270B updates the database by adding the at least one of candidate faces on the candidate list designated by the yet additional user input.

It is noted that, the disclosed apparatus allows the user to actively call off the above user-selection function through providing a user input. Also Referring to FIG. 2B, in such case, the user input module 250B receives a further user input which designates that the user-selection function is called off and the first matching candidate face is to be updated with the target face. In response, the database-updating module 270B updates the candidate facial features of the first matching candidate face with the target facial features.

Figure 2C:
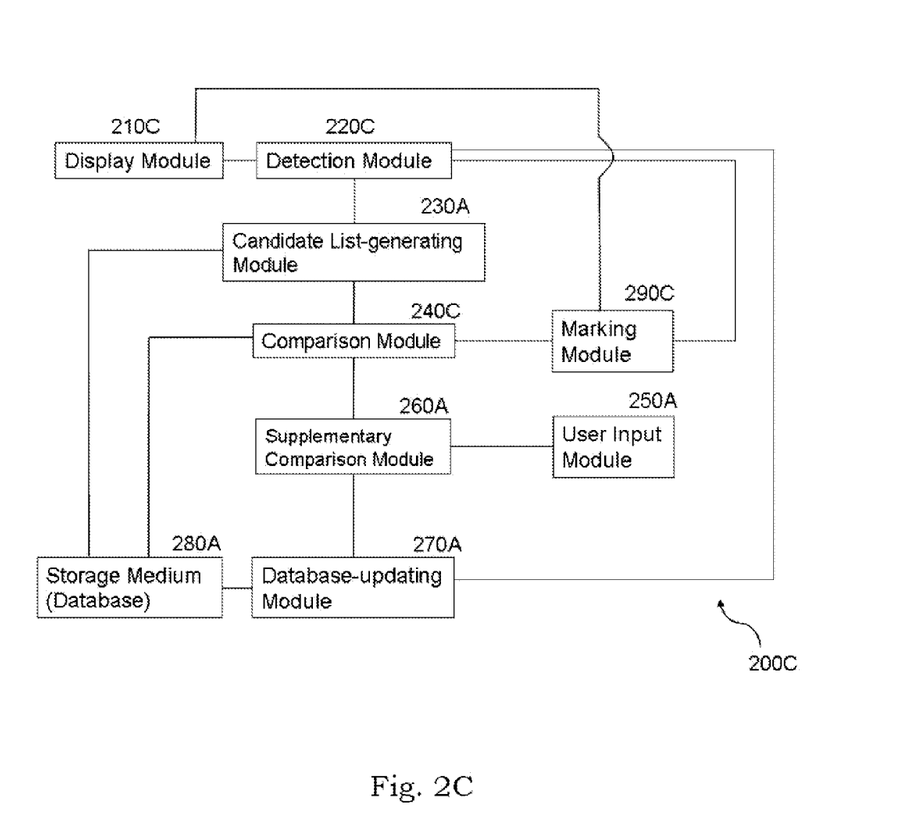
FIG. 2C, which is a block diagram of a face recognition apparatus in accordance with another preferred example of the present invention.

Referring to FIG. 2C, which is a block diagram of a face recognition apparatus 200C in accordance with another preferred example of the present invention. As shown, in comparison with 200A and 200B, the face recognition apparatus 200C further comprises a marking module 290C which is electrically coupled with the display module 210C, the detection module 220C, and the comparison module 240C. Recall, in previous sections, it has been mentioned that the present invention discloses a "key frame" operation for accelerating face tracking in a video. When functioning, the display module 210C displays a video, the detection module 220C detects an arbitrary target face from a frame of the provided video at a certain frame position, say frame numbered n, and the same arbitrary target face from a subsequent frame of the provided video at frame numbered n+1, wherein the arbitrary target face has a set of arbitrary target facial features at frame numbered n and frame numbered n+1, respectively. The comparison module 240C then compares the arbitrary target facial features at frame numbered n and frame numbered n+1, whereupon to generate a third comparison result. The marking module 290C receives the third comparison result from the comparison module 240C, when the third comparison result indicates that the arbitrary target facial features at frame numbered n+1 is different from the arbitrary target features at frame numbered n, the marking module 290C marks the frame at frame numbered n+1 as the image to be provided to the display module 210C for displaying, otherwise marking the frame at frame numbered n+1 as the frame at frame numbered n to be detected by the detection module 220C. It is noted that the arbitrary target face is not necessary to be the target face as described in previous sections.

Figure 2D:
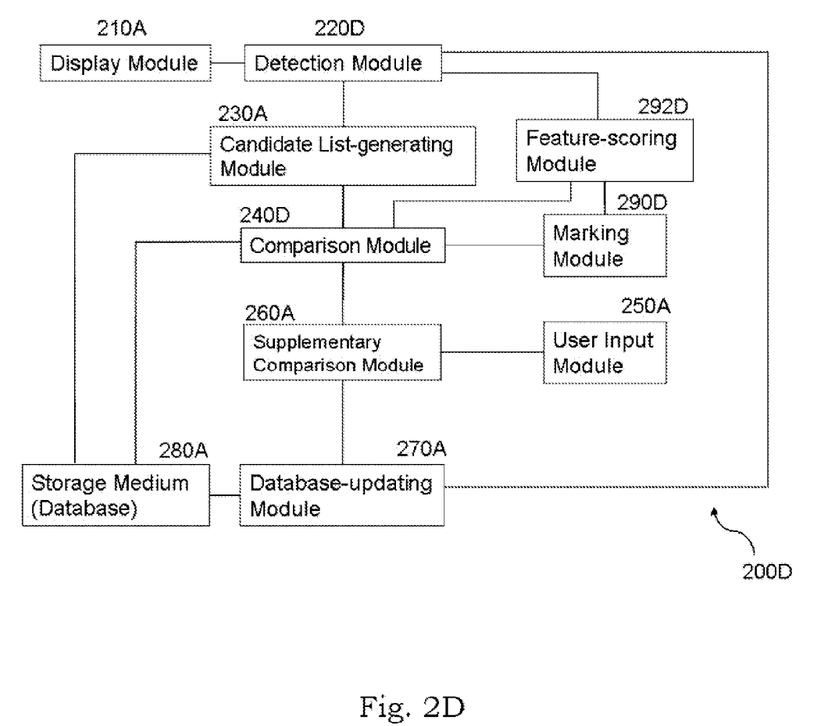
FIG. 2D, which is a block diagram of a face recognition apparatus in accordance with yet another preferred example of the present invention.

Referring to FIG. 2D, which is a block diagram of a face recognition apparatus 200D in accordance with yet another preferred example of the present invention. As mentioned in previous sections, the present invention discloses a feature-scoring mechanism to ensure quality facial features are used for analysis at all times. As shown in the figure, compared to 200A, 200B and 200C, the face recognition apparatus 200D further comprises a feature-scoring module 292D which is electrically coupled with the detecting module 220D and the comparison module 240D. In addition, the marking module 290D is electrically coupled with the feature-scoring module 292D and the comparison module 240D. When functioning, the display module 210A displays a video, the detection module 220D detects and extracts a set of facial features for an arbitrary target face from a frame of the provided video at a certain frame position, say frame numbered n, and the same arbitrary target face from a subsequent frame of the video at frame numbered n+1. The feature-scoring module 292D, responsive to the detection module, estimates a score for the arbitrary target face at frame numbered n, whereupon to generate a first feature score, and estimates a score for the same arbitrary target facial features at frame numbered n+1, whereupon to generate a second feature score. Then, the comparison module 240D receives the first and second feature scores from the feature-scoring module 292D and in response, compares the first feature score with the second feature score, whereupon to generate a fourth comparison result. The marking module 290D then receives the fourth comparison result and in response, when the fourth comparison result indicates that the second feature score is higher than the first feature score, marks the facial features of the arbitrary target face at frame numbered n+1 as the arbitrary target facial features at frame numbered n for the feature-scoring module 292D and the target facial features for the comparison module 240D as well, otherwise marking the facial features of the arbitrary target at frame numbered n as the arbitrary target facial features at frame numbered n for the feature-scoring module 292D and the target facial features for the comparison module 240D as well. The score estimation is based on indices such as face orientation, clarity, shape, lighting condition, shadowing, and other measures.

Figure 3A:
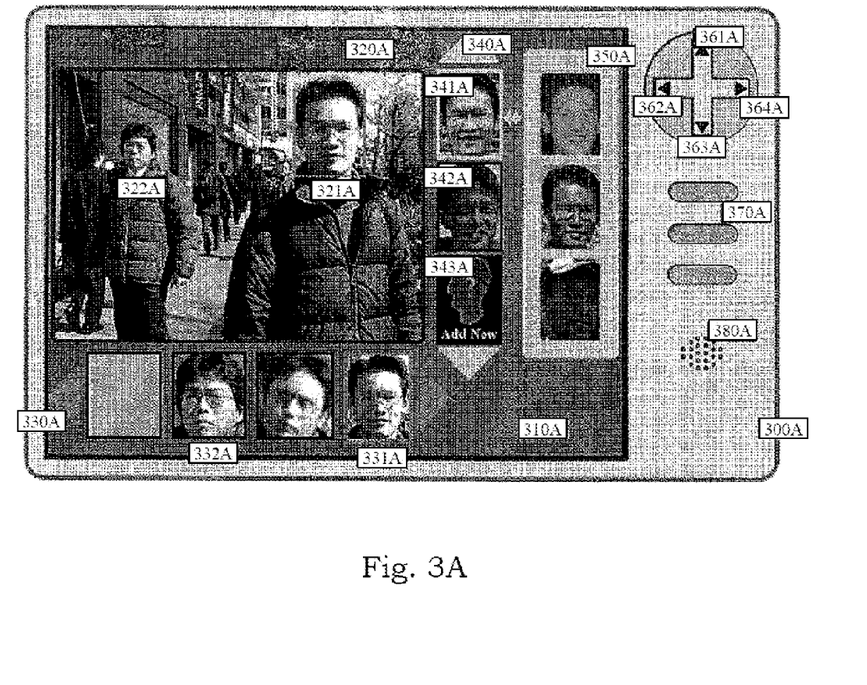
FIG. 3A is an illustration of an electronic image capturing device embodying the present invention in the form of a user interface.

Referring to FIG. 3A, in the third embodiment of the present invention, an electronic image capturing device 300A embodying the present invention in the form of a user interface is disclosed. As shown, the proposed system 300A comprises a display 310A and input buttons 361A, 362A, 363A, 364A, and 370A. When the user is capturing an image, reviewing still images or recording a video with the electronic image capturing device 300A, the user can activate a face recognition program disclosed by the present invention by using input buttons 361A, 362A, 363A, 364A, and 370A to activate a user interface also disclosed by the present invention. Once the user interface to the program is active, the user will see the current captured image 320A on the upper left pane of the display 31A. A face detection program will detect the appearance of one or more human faces from the image 320A. The detected faces will be marked by a highlighted bounding box 321A and 322A. There will be one active selection detected face and various passive selection detected faces in one image. The active selection detected face will be marked by the concrete bounding box 321A and an active selection face thumbnail 331A will be displayed on a selection bar 330A on the lower pane of the display 310A. The user can select different active selection face by pressing the left and right input buttons 362A and 364A.

Once the user has selected an active selection face, for example, the face with concrete bounding box 321A within the image 320A with the respective thumbnail 331A displayed in the selection bar 330A, the disclosed face recognition program will match the active selection face image against the face records in the database stored in a storage medium. The face recognition program will match faces from the database with from high to low accuracy confidence level and display the matched candidates on a candidate bar 340A in a descending or ascending order. As shown in FIG. 3A, a total of 2 candidates are displayed in a descending order. For a particular candidate, a previously recorded thumbnail image will be displayed the candidate bar 340A. The higher confidence candidate is marked in a bounding box 341A and the lower confidence candidate 342A follows. An 'Add New' entry 343A is listed on the candidate bar 340A in case the user decides that the detected face is new to the database and no previous records match.

For a particular candidate, for example the higher confidence candidate 341A, the associated face thumbnails stored in the database will be displayed on an associated thumbnails bar 350A, which is next to the candidate bar 340A. The associated face thumbnails are previously recorded face images of the same identity associated with the currently selected candidate on the candidate bar 340A. If the user uses the up/down buttons 361A and 363A to select another candidate to match the active selection face, for example, the next candidate 342A, the associated thumbnails bar 350A will display associated face thumbnails of the candidate 342A instead. Once the user has finished selecting the best candidate or created a new entry in the candidate bar 340A, the user can use the input buttons 370A to confirm the selection for the current active selection face or can wait for a short programmable time for the automatic confirmation. The user can then recognize and match other detected faces by using the left/right buttons 362A and 364A to select another detected face as the active selection face, or skip the face recognition process of the current captured image by using other user input buttons. In addition, the audio interface 380A can serve as an audio output module to instruct the user to make the selections, for example. And/or, the audio interface 380A can function as an audio input module such as a microphone for the user to carry out the voice control.

Figure 3B:
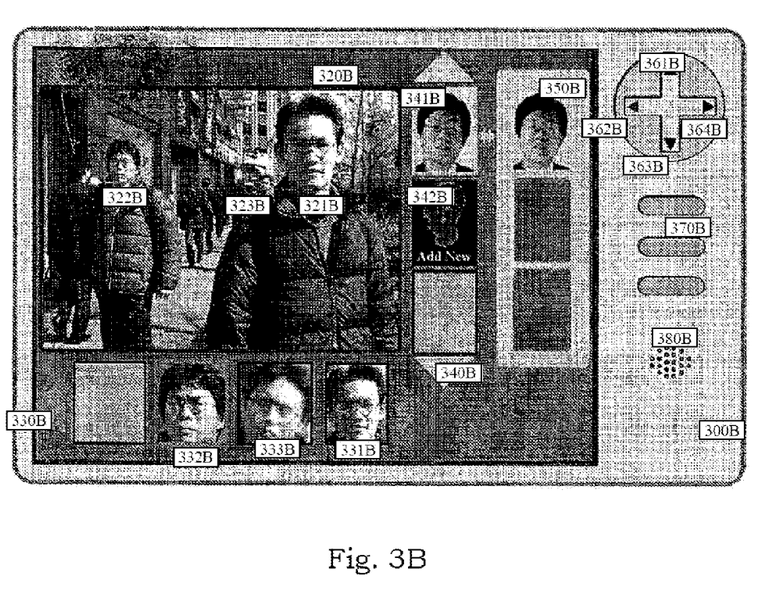
FIG. 3B is another illustration of an electronic image capturing device embodying the present invention in the form of a user interface.

Referring to FIG. 3B, it is a screen display 320B of the electronic image capturing device 300B when the user uses the left/right buttons 362B and 364B to select, from the selection bar 330B, another detected face 332B as the active selection face. The respective face within the image will be highlighted with a concrete bounding box 322B. A respective thumbnail 332B will be displayed in the selection bar 330B. Again, the face recognition program will match the image against face records from the database stored in the storage media for potential candidates, from the highest accuracy confidence level to a lower accuracy confidence level. The candidates will be displayed on the candidate bar 340B in descending or ascending order for this active selection. As shown, only one candidate 341B is displayed for the active selection face 332B.

Figure 4:
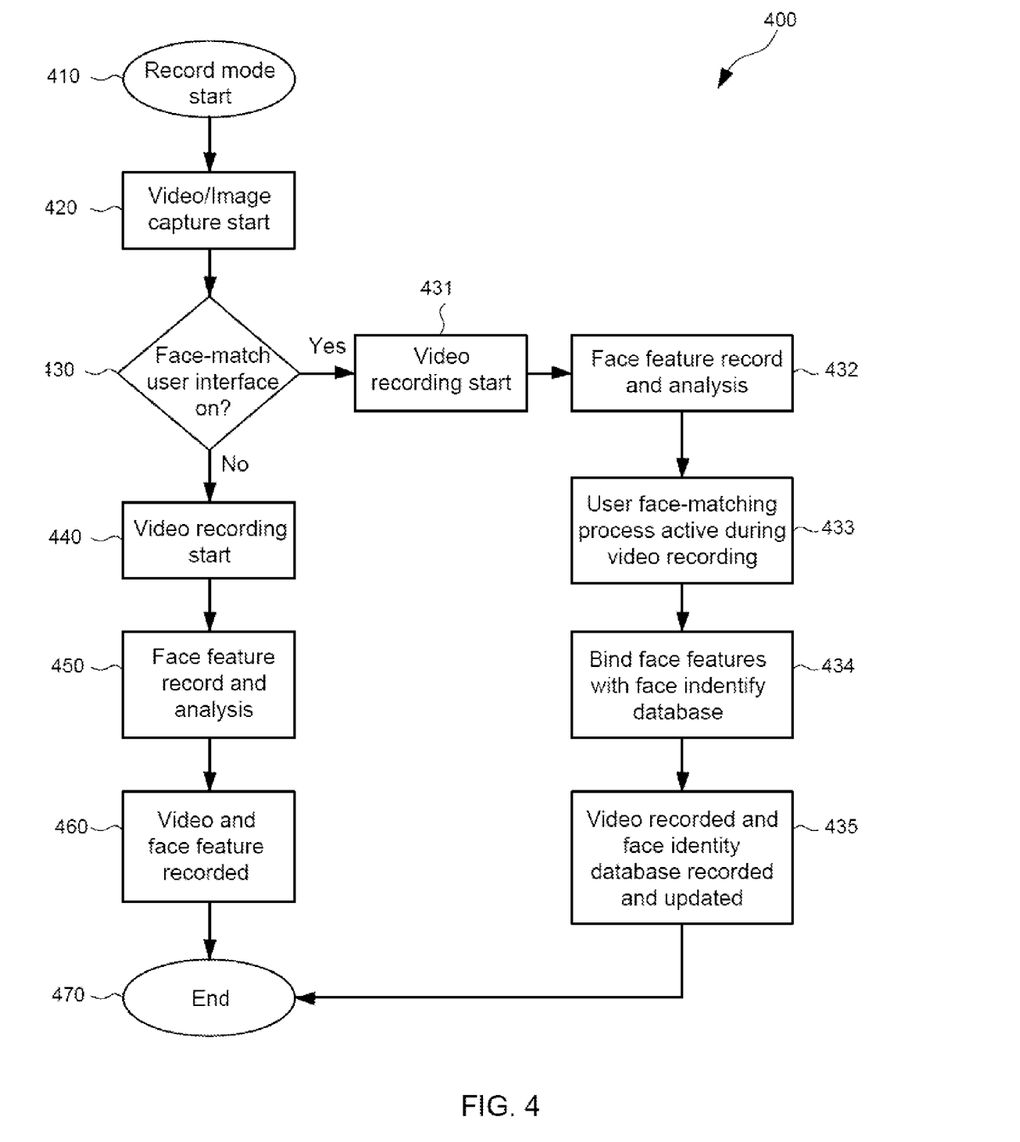
FIG. 4 is a flow diagram of the present invention embodied as a program, a user interface and an apparatus, running in recording mode operation on an image capturing device.

Referring to FIG. 4, which is a flow diagram 400 of the proposed face recognition system which includes the method embodied as a program, a user interface and an apparatus running in recording mode operation on a digital camera, video camera, mobile phone or any other computing devices including a camera and a processor system. Firstly, the video capturing operation is initiated by the user (410, 420). Next, the proposed systems checks if the face matching user interface is set to on (430). If it is set to on, the video will then be recorded (431) and the video image will be analyzed to detect and recognize any face that appears in the image (432). These matching records will be updated to the database at the end of the operation. If the user uses the user interface to select an alternative candidate instead of the automatically found highest confidence candidate, the system will register the facial features of the active selection face to the selected candidate (433, 434). The face database will then be recorded and updated (435). If the user selects to add a new entry of face identity, the addition can be done in a real-time manner or at a later time scheduled by the user (433, 434, 435). If the user-selection mechanism is set to off, the video will be recorded (440) and the video image will be analyzed to find and recognize any face detected (450). The video will be recorded but no registration of detected face with the records in the database is performed in this mode (460).

Figure 5:
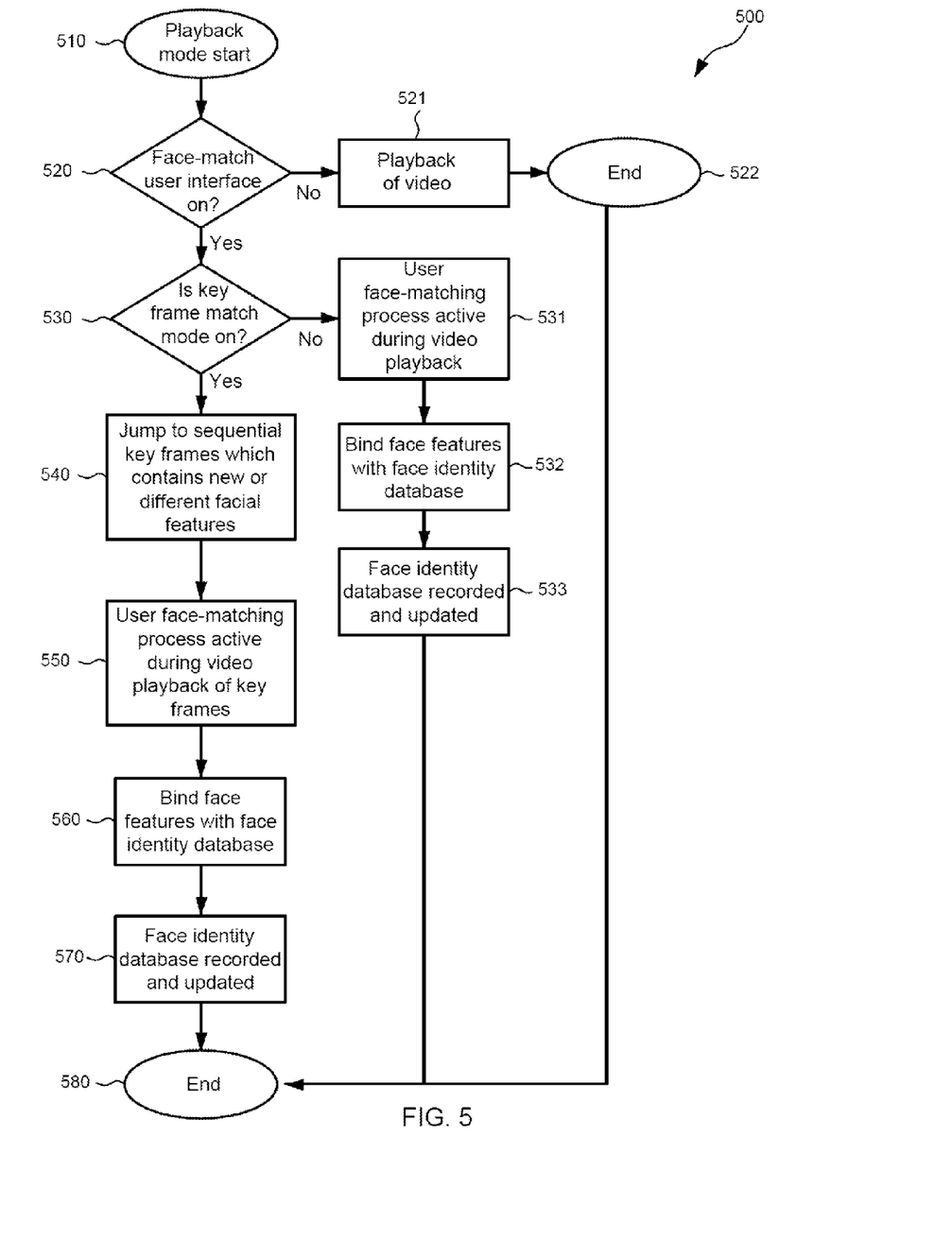
FIG. 5 is a flow diagram of the present invention embodied as a program, a user interface and an apparatus running in playback and edit mode operation on an image capturing device.

Referring to FIG. 5, which is a flow diagram 500 of the proposed face recognition system which includes the face recognition method embodied as a program, a user interface and an apparatus running in playback and edit mode operation on a digital camera, video camera, mobile phone or any other computing devices including a camera and a processor system. Firstly, the image review or video playback operation is initiated by the user (510). Next, the proposed systems checks if the face matching user interface is set to on (520). If it is set to off, the user can iterates each captured image or the recorded video will be played back until the end of the sequence (521, 522). If the face matching user interface is set to on, the system will check if the operation is in a "key frame match mode"(530). The key frame match mode will be described in detail below. If the system is not in the key frame match mode, the user can perform the face matching operation during playback mode the same as in the record mode (531, 532, 533). The video image will be analyzed to detect and recognize any face detected from the image; if the user uses the user interface to select an alternative candidate instead of the automatically found highest confidence candidate (531), the system will register the facial features of the active selection face to the selected candidate (532). The face database will then be recorded and updated (533). If the user selects to add a new entry of face identity, the addition can be done in a real-time manner or at a later time scheduled by the user (531, 532, 533). The video will continue play back till the end of sequence. If system is in the key frame match mode, the video sequence will be played back in a way that only key frames which contain new or different face features will be displayed (540). The user can perform the face matching operation during as the key frames are being played back the same as in the record mode (550, 560, 570). Faces are matched more efficiently and quickly as video frames with same or similar facial features are skipped.

Figure 6:
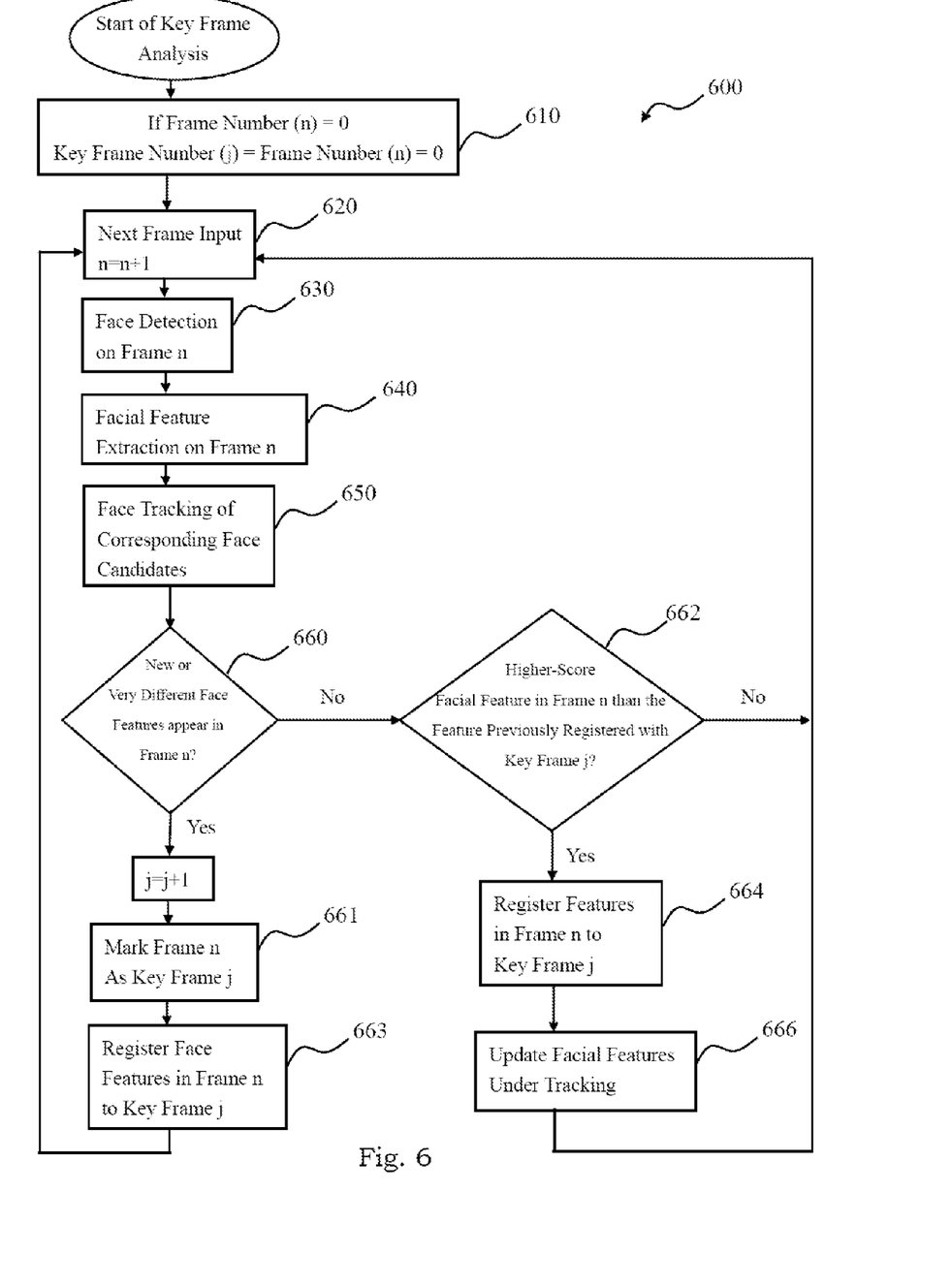
FIG. 6 is a flow diagram showing the identification and designation of the key frame in accordance with an example of the present invention.

Referring to FIG. 6, which is a flow diagram 600 showing the identification and designation of the key frame in accordance with an example of the present invention. The process is embodied in a frame number-based manner. Firstly, the video is analyzed based on face detection and facial feature extraction, where a frame within the video is designated a frame number (610, 620, 630, 640). Next, the extracted facial features are utilized to track the corresponding face candidates in the frame at interest (650). If this frame contains new or very different features regarding the face candidates under tracking, it will be selected to mark as a key frame with certain key frame serial number, and the features of the face under tracking will be registered with this new key frame (660, 661, 663). If there are no new nor very different features occurring in the frame at interest, the features of this frame will be compared with an existing key frame with certain key frame number to determine whether the frame at interest is qualified to replace such existing key frame (660, 662, 664, 666).

Figure 7:
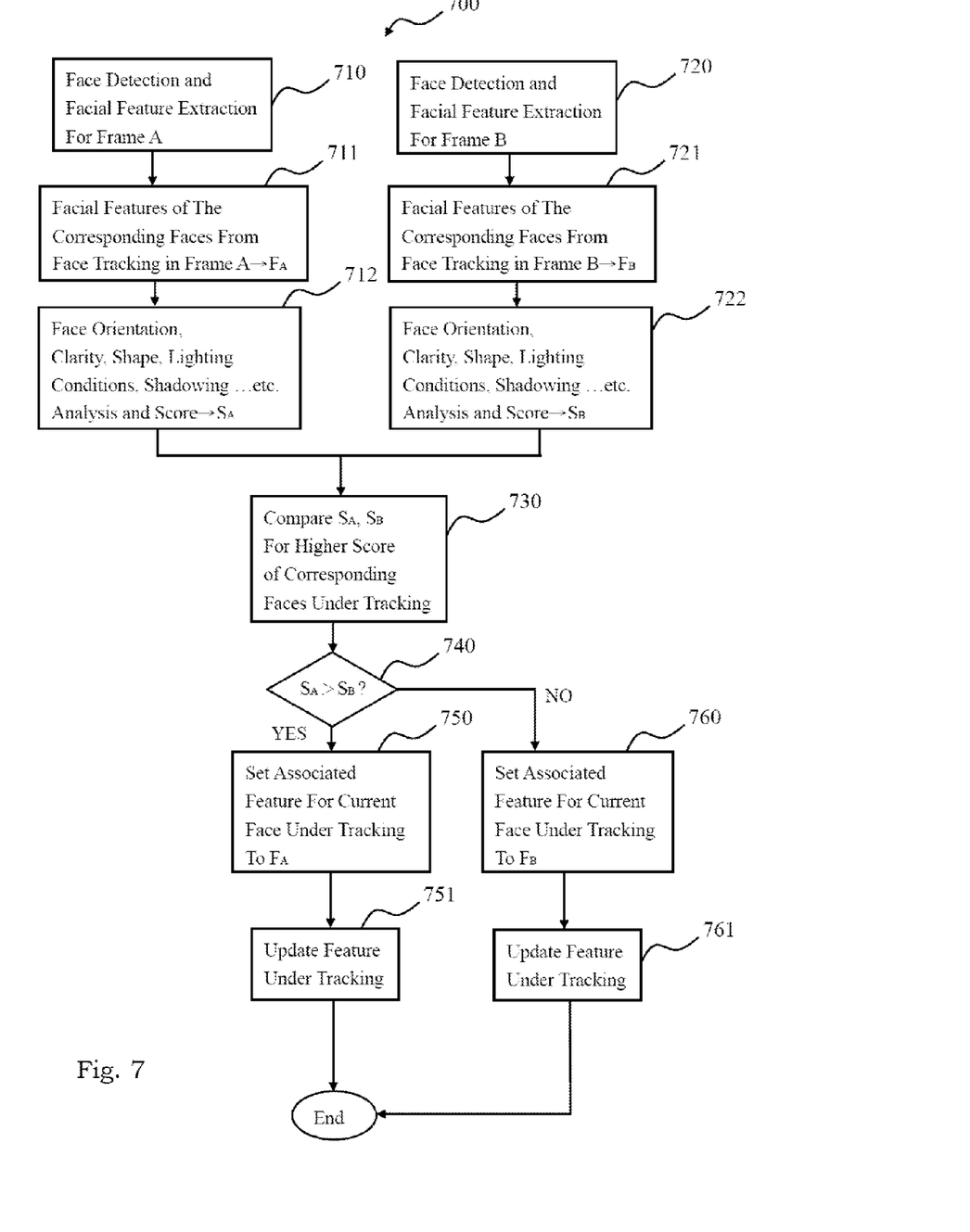
FIG. 7 is a flow diagram showing the selection of facial features for face tracking between various video frames using a score based method in accordance with an example of the present invention.

Referring to FIG. 7, which is a flow diagram 700 showing the selection of facial features for face tracking between various video frames using a score based method in accordance with an example of the present invention. The process is embodied in a frame number-based manner. Firstly, the video is analyzed based on face detection and facial feature extraction, where facial features of a face under tracking in two frames A and B are extracted. (710, 711, 720, 721). Meanwhile, a score is estimated for the face under tracking in both frame A and frame B, based on indices such as face orientation, clarity, shape, lighting condition, shadowing, and other measures (712, 722). Next, the estimated sores are compared (730), and the facial features of the higher scored frame will be selected as the features to use for subsequent face tracking (740, 750~751, 760~761).

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the inventions as determined by the appended claims when interpreted in accordance with the breath to which they are fairly and legally entitled.

It is understood that several modifications, changes, and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A face recognition method, comprising:
   providing an image; defining a target face from said image, said target face having a set of extracted target facial features;
   generating a candidate list of one or more candidate faces, each candidate face having a set of candidate facial features thereof;
   comparing said target face with each said candidate face based on said target facial features and said candidate facial features to determine a first matching candidate face out of said candidate list;
   receiving user input, said user input designating a second matching candidate face out of said candidate list,
   wherein in response to said user input if said first and second matching candidates are identical, updating the candidate facial features of said first matching candidate face with said target facial features, otherwise updating the candidate facial features of said second matching candidate face with said target facial features.

2. The method according to claim 1, said user input being entered through a graphical user interface by modifying the appearance of at least one graphical feature representing at least one program.

3. The method according to claim 1, the step of defining said target face further comprising:
   detecting n potential target faces from said image, n being a natural number; and receiving an additional user input, said additional user input designating the target face out of said n potential target faces; and providing the designated target face for subsequent processing.

4. The method according to claim 1, further comprising:
   receiving an additional user input, said additional user input designating that at least one of said candidate face on said candidate list is to be added to the database where said candidate facial features data are stored; and
   adding said at least one of candidate face on said candidate list the candidate features thereof to the database where said candidate facial features data are stored.

5. The method according to claim 1, further comprising:
   receiving further user input, said further user input designating that said first matching candidate face is to be updated with said target face; and in response to receiving said further user input, the candidate facial features of said first matching candidate face is updated with said target facial features.

6. The method according to claim 1, said image is provided via a process comprising:
providing a video;
detecting, in a frame of said video at a certain frame numbered n, an arbitrary target face, said arbitrary target face having a set of arbitrary target facial features at frame numbered n;
detecting, in a subsequent frame of said video at frame numbered n+1, said arbitrary target face, said arbitrary target face having a set of arbitrary target facial features at frame numbered n+1; and
in response to detecting the arbitrary target face, comparing said arbitrary target facial features at frame numbered n and frame numbered n+1, when the comparison result indicates that said arbitrary target facial features at frame numbered n+1 is different from said arbitrary target facial features at frame numbered n, marking said frame at frame numbered n+1 as said image to be displayed, otherwise marking said frame at frame numbered n as said image to be displayed.

7. The method according to claim 6, said arbitrary target face being said target face and said arbitrary target facial features being said target facial features.

8. The method according to claim 1, said target facial features are determined via a process comprising:
providing a video;
detecting and estimating a score for, in a frame of said video at a certain frame numbered n, an arbitrary target face at frame numbered n, and extracting a set of arbitrary target facial features at frame numbered n for said arbitrary target face at frame numbered n;
detecting and estimating a score for, in a subsequent frame of said video at frame numbered n+1 said arbitrary target face at frame numbered n+1, and extracting said set of arbitrary target facial features at frame numbered n+1 for said arbitrary target face at frame numbered n+1; and
in response to estimating score for the arbitrary target face, comparing said score of said arbitrary target face at frame numbered n and frame numbered n+1, when the comparison result indicates that the score of said arbitrary target face at frame numbered n+1 is higher than that of said arbitrary target face at frame numbered n, marking said arbitrary target facial features at frame numbered n+1 as said arbitrary target facial features at frame numbered n and said target facial features as well, otherwise marking said arbitrary target facial features at frame numbered n as said arbitrary target facial features at frame numbered n and said target facial features as well.

9. The method according to claim 8, the score estimation is based on face orientation, clarity, shape, lighting condition, shadowing, and other measures of said arbitrary target face at a certain frame numbered n and a subsequent frame numbered n+1, respectively.

10. The method according to claim 8, said arbitrary target face being identical with said target face.

11. A face recognition apparatus, comprising:
a display module for displaying an image;
a detection module, electrically coupled with said display module, for detecting a target face from said image and whereupon to generate a detection result designating said target face, said target face having a set of extracted target facial features;
a candidate list-generating module, electrically coupled with said detection module and a storage medium, for generating a candidate list of one or more candidate faces for matching said target face, each candidate face having a set of candidate facial features thereof, said candidate facial features data being stored in a database stored in said storage medium;
a comparison module, electrically coupled with said candidate list-generating module and said storage medium, for comparing said target face with each said candidate face based on said target facial features and the candidate facial features of each said candidate face, whereupon to generate a first comparison result indicating a first matching candidate face out of said candidate list;
a database-updating module, electrically coupled with said detection module, said comparison module and said storage medium, receiving said target facial features data from said detection module and said first matching candidate data from said comparison module, for updating the candidate facial features of said first matching candidate face stored in said database with said target facial features;
a user input module for receiving a user input, said user input designating a second matching candidate face out of said candidate list; and
a supplementary comparison module, electrically coupled with said user input module, said comparison module and said database-updating module, for comparing said first and second matching candidate face based on the candidate facial features of said first and second matching candidate face, respectively, whereupon to generate a second comparison result,
wherein said database-updating module receives said second comparison result from said supplementary comparison module, when said the second comparison result indicates that said first and second matching candidate faces are identical, said database-updating module updates the candidate facial features of said first matching candidate face stored in said database with said target facial features, otherwise said database-updating module updates the candidate facial features of said second matching candidate face stored in said database with said target facial features.

12. The apparatus according to claim 11, further comprising:
a marking module electrically coupled with said display module, said detection module, and comparison module,
wherein said display module displays a video; said detection module detects an arbitrary target face in a frame of said video at a certain frame numbered n and said arbitrary target face in a subsequent frame of said video at frame numbered n+1, said arbitrary target face having a set of arbitrary target facial features at frame numbered n and frame numbered n+1, respectively; said comparison module, responsive to said detection module, compares said arbitrary target facial features at frame numbered n and frame numbered n+1, whereupon to generate a third comparison result; and said marking module receives said third comparison result from said comparison module and in response, when said third comparison result indicates that said arbitrary target facial features at frame numbered n+1 is different from said arbitrary target features at frame numbered n, said marking module marks said frame at frame numbered n+1 as said image to be displayed by said display module, otherwise marking said frame at frame numbered n+1 as said frame at frame numbered n to be detected by said detection module.

13. The apparatus according to claim 12, said arbitrary target face being said target face and said arbitrary target facial features being said target facial features.

14. The apparatus according to claim 11, further comprising:
   a feature-scoring module and a marking module electrically coupled with each other, said feature scoring module being further electrically coupled with said detection module and said comparison module, said marking module being further electrically coupled with said comparison module,
   wherein said display module displays a video; said detection module detects an arbitrary target face in a frame of said video at a certain frame numbered n and said arbitrary target face in a subsequent frame of said video at frame numbered n+1, and extracts a set of arbitrary target facial features at frame numbered n for said arbitrary target face at frame numbered n and a set of arbitrary target facial features at frame numbered n+1 for said arbitrary target face at frame numbered n+1; said feature-scoring module, responsive to detecting the arbitrary target face, estimates a score for said arbitrary target face at frame numbered n, whereupon to generate a first feature score, and estimates a score for said arbitrary target face at frame numbered n+1, whereupon to generate a second feature score; said comparison module receives said first and second feature score from said feature-scoring module and in response, compares said first feature score with said second feature score, whereupon to generate a fourth comparison result, said marking module, receiving said fourth comparison result, when said fourth comparison result indicates that said second feature score is higher than said first feature score, marks said arbitrary target facial features at frame numbered n+1 as said arbitrary target facial features at frame numbered n for said feature-scoring module and said target facial features as well, otherwise marks said arbitrary target facial features at frame numbered n as said arbitrary target facial features at frame numbered n for said feature-scoring module and said target facial features as well.

15. The apparatus according to claim 14, the score estimation is based on indices such a face orientation, clarity, shape, lighting condition, shadowing, and other measures.

16. The apparatus according to claim 14, said arbitrary target face being said target face.

17. An electronic image capturing device, comprising:
   a display for presenting at least one window, wherein a first window displays an image;
   a second window displays one or more first face thumbnails, said first thumbnail being faces detected from said image, one of which a target face to be recognized;
   a third window displays one or more second face thumbnails, said second thumbnail being candidate faces in terms of matching said target face, one of said candidate faces being a user-selected candidate face;
   a fourth window displays one or more third face thumbnail, said third face thumbnail being faces or facial features associated with said user-selected candidate face; and
   a user input module, for receiving at least one user input, wherein a first user input designates said target face out of said first thumbnails; and a second user input designates said user-selected candidate face out of said second thumbnails.

18. The electronic image capturing device according to claim 17, further comprising:
   an icon in said third window; and a third user input received by said user input module, said third user input designating that said target face is to be added to a database where said facial features data are stored by selecting said icon.

19. The electronic image capturing device according to claim 17, said display being liquid crystal display (LCD), plasma display or light emitting diode (LED) display.

20. The electronic image capturing device according claim 17, said user input module being press button, key pad, touch panel, and voice control module.

* * * * *